US012267751B2

(12) United States Patent
Yi et al.

(10) Patent No.: US 12,267,751 B2
(45) Date of Patent: Apr. 1, 2025

(54) METHOD AND APPARATUS FOR IDENTIFYING OBJECTS IN A SPATIAL REGION

(71) Applicant: ALIBABA GROUP HOLDING LIMITED, Grand Cayman (KY)

(72) Inventors: Meng Yi, Hangzhou (CN); Xu Jin, Hangzhou (CN); Ding Jiandong, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 678 days.

(21) Appl. No.: 17/541,445

(22) Filed: Dec. 3, 2021

(65) Prior Publication Data

US 2022/0217500 A1    Jul. 7, 2022

(30) Foreign Application Priority Data

Dec. 9, 2020   (CN) .......................... 202011430381.9

(51) Int. Cl.
*H04W 4/029* (2018.01)
*G06Q 30/0251* (2023.01)
*G06Q 30/0601* (2023.01)
*H04W 4/02* (2018.01)

(52) U.S. Cl.
CPC ........ *H04W 4/029* (2018.02); *G06Q 30/0261* (2013.01); *G06Q 30/0623* (2013.01); *G06Q 30/0639* (2013.01); *H04W 4/023* (2013.01)

(58) Field of Classification Search
CPC .. H04W 4/029; H04W 4/023; G06Q 30/0623; G06Q 30/0261; G06Q 30/0639

USPC ...................................................... 455/456.1
See application file for complete search history.

(56) References Cited

U.S. PATENT DOCUMENTS

| | | |
|---|---|---|
| 7,259,668 B2 | 8/2007 | Casey |
| 8,259,692 B2 | 9/2012 | Bajko |
| 8,392,113 B2 | 3/2013 | Gupta et al. |
| 8,606,293 B2 | 12/2013 | Kim et al. |
| 8,792,906 B2 | 7/2014 | Batada et al. |

(Continued)

FOREIGN PATENT DOCUMENTS

CN            109165997 A       1/2019

*Primary Examiner* — Ted M Wang
(74) *Attorney, Agent, or Firm* — James J. DeCarlo; Greenberg Traurig, LLP

(57) ABSTRACT

Provided in embodiments of the disclosure are methods, apparatuses, and computer-readable media for data processing. Location information and personalized information of a user are obtained in real-time; then a target spatial region corresponding to the location information is determined, the target spatial region including at least one physical object matching the personalized information; and then shopping guide data is generated for the user based on the at least one physical object matching the personalized information. By obtaining the real-time location of the user in combination with the personalized information of the user such as a purchase preference of historical purchase behavior, a shopping place and a branded shop near the user are provided to guide the user to perform in-store shopping, thereby improving purchase efficiency for the user, effectively providing personalized shopping recommended content to the user, and greatly improving purchase experience of the user.

14 Claims, 4 Drawing Sheets

(56) References Cited

U.S. PATENT DOCUMENTS

| | | |
|---|---|---|
| 8,972,168 B2 | 3/2015 | Acker et al. |
| 8,988,283 B2 | 3/2015 | Erad et al. |
| 9,014,713 B1 | 4/2015 | Shaw |
| 9,215,685 B2 | 12/2015 | Gupta et al. |
| 9,462,462 B2 | 10/2016 | Casey |
| 9,473,904 B2 | 10/2016 | Bennett |
| 9,578,617 B2 | 2/2017 | Nyman et al. |
| 9,813,863 B2 | 2/2017 | Jose et al. |
| 10,102,564 B2 | 10/2018 | Pellow et al. |
| 2013/0115969 A1 | 5/2013 | Holmes et al. |
| 2013/0181867 A1 | 7/2013 | Sturdivant et al. |
| 2014/0070946 A1* | 3/2014 | Ambrefe, Jr. ......... H04W 4/029 340/541 |
| 2015/0169597 A1 | 6/2015 | Edge et al. |
| 2016/0020861 A1 | 1/2016 | Jin et al. |
| 2016/0212582 A1 | 7/2016 | Jin et al. |
| 2016/0217543 A1 | 7/2016 | Chao et al. |
| 2016/0284014 A1 | 9/2016 | Adel |
| 2017/0006534 A1 | 1/2017 | Edge et al. |
| 2017/0076312 A1* | 3/2017 | Sharma .............. G06Q 30/0224 |
| 2020/0097028 A1 | 3/2020 | Axmon et al. |

\* cited by examiner

METHOD AND APPARATUS FOR IDENTIFYING OBJECTS IN A SPATIAL REGION

CROSS-REFERENCE TO RELATED APPLICATIONS

This application claims the benefit of priority of Chinese Application No. 202011430381.9 filed Dec. 9, 2020, which is hereby incorporated by reference in its entirety.

BACKGROUND

Technical Field

The disclosure relates to the technical field of the Internet and, in particular, to a method for data processing and an apparatus for data processing.

Description of the Related Art

With the development of Internet technologies, more users are using network platforms to shop online. However, there are still many users who choose to perform in-store shopping. Personalized recommendations are an important solution to achieve precision marketing and are widely utilized in online shopping environment, which brings convenience to customers and merchants. Currently, in an in-store shopping environment, users usually see the same recommended shopping guide products. For example, when a user shops in a mall, the mall may use shopping guide advertisements to guide the user's shopping experience in the mall. For online shopping, personalized shopping guide recommendations are often made for a user based on the user's preferences and data (e.g., online purchase and browsing behavior). However, none of these methods can provide more personalized recommended content to a user.

BRIEF SUMMARY

The technical problem to be solved by embodiments of the disclosure is to provide a method for data processing to solve the technical problems in current systems where recommended personalized shopping content cannot be provided to a user in an in-store shopping scenario.

Correspondingly, the embodiments of the disclosure further provide an apparatus for data processing to ensure implementation and application of the above-mentioned method.

To solve the problem mentioned above, and others, a method is disclosed including obtaining location information and personalized information of a user; determining a target region corresponding to the location information, the target region comprising at least one object matching the personalized information; and generating shopping guide data for the user based on the at least one object matching the personalized information.

In an embodiment, generating shopping guide data for the user based on the at least one object matching the personalized information includes generating a product query request for the matching object; sending the product query request to a pre-configured server, and obtaining product object data corresponding to the product query request; and generating the shopping guide data for the user based on the product object data.

In an embodiment, the product object data at least includes a product object corresponding to the product query request and attribute information of the product object and generating the shopping guide data for the user based on the product object data includes generating a product list by using the attribute information of the product object, the product list comprising a product display location corresponding to the product object.

In an embodiment, generating the shopping guide data for the user based on the product object data includes extracting, from the attribute information of the product object, price information of the product object in different shopping place objects, and displaying price comparison information of the product object in the different shopping place objects.

In an embodiment, the method further includes, in response to a user operation performed on the product display location, determining a target product object, and displaying product detail information of the target product object, wherein the product detail information at least includes one of product introduction information of the target product object, a target branded shop object to which the product belongs, a target shopping place object to which the product belongs, and shop location information of the target branded shop object.

In an embodiment, the method can further include obtaining sales promotion information configured by the target branded shop object if it is detected that the location information successfully matches the shop location information.

In an embodiment, the method can further include, in response to a user operation performed on the product display location, determining a target product object, and displaying an order interface for the target product object; and in response to a user operation performed on the order interface, generating order information for the target product object.

In an embodiment, the product display location includes a feedback control, and the method further includes, in response to a user operation performed on the feedback control, selecting a target product display location, generating feedback information for the target product display location, and sending the feedback information to the pre-configured server.

In an embodiment, the object includes a branded shop object; the personalized information at least includes brand preference information, and generating a product query request for the matching object includes performing matching between the brand preference information of the user and the branded shop object, and obtaining at least one target branded shop object; obtaining place location information of a target shopping place object to which the target branded shop object belongs; and generating a product query request for the target branded shop object by using the place location information.

In an embodiment, generating a product query request for the matching object further includes extracting N target preferred brands from the brand preference information of the user. In an embodiment, performing matching between the brand preference information of the user and the branded shop objects and obtaining at least one target branded shop object includes performing matching between the N target preferred brands and the branded shop objects and obtaining at least one target branded shop object.

Further disclosed in the embodiments of the disclosure is an apparatus for data processing comprising a processor and a storage medium for tangibly storing thereon program logic for execution by the processor to perform the above methods. The embodiments of the disclosure further disclose a computer-readable storage medium, having instructions stored thereon, wherein when executed by one or more processors, the instructions cause the processor to perform the above methods.

In the embodiments of the disclosure, location information and personalized information of a user may be obtained in real-time, then a target region corresponding to the location information is determined, wherein the target region includes at least one object matching the personalized information. Then, shopping guide data is generated for the user based on the at least one object matching the personalized information. By obtaining the real-time location of the user and combining the same with the personalized information thereof such as a purchase preference of historical purchase behavior, a shopping place and branded shops near the user can be provided and the user can be guided to perform in-store shopping, thereby improving purchase efficiency for the user, effectively providing personalized shopping recommended content to the user, and greatly improving purchase experience of the user.

DETAILED DESCRIPTION

Figure 1:
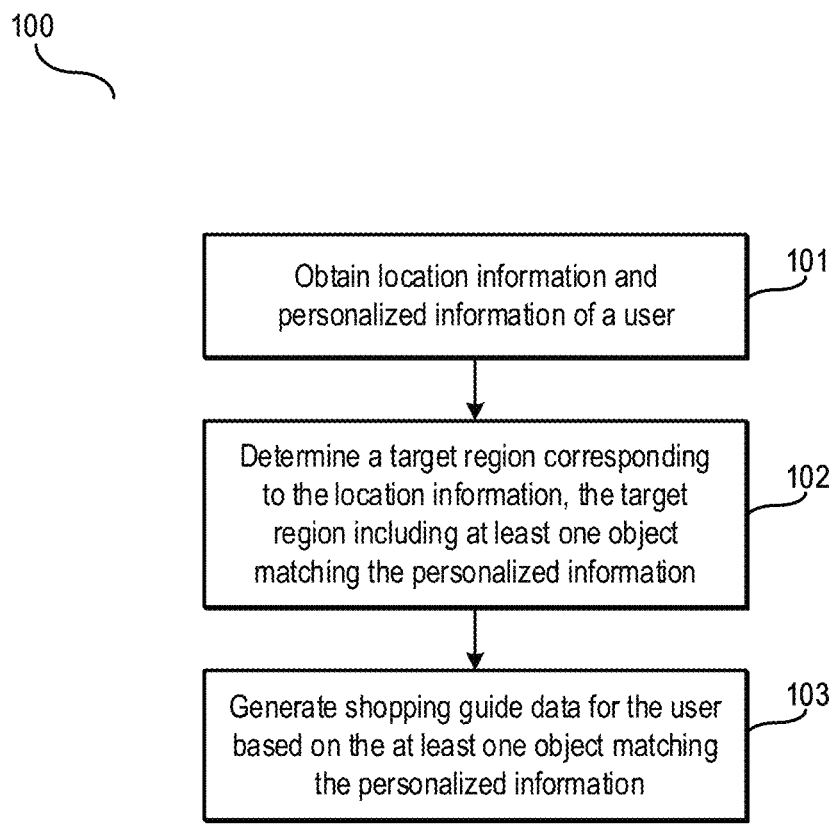
FIG. 1 is a flow diagram illustrating a method for data processing according to some of the example embodiments.

To fully describe the above-mentioned objectives, features, and advantages of the disclosure, the example embodiments are further described below in detail in combination with the accompanying figures and the specific embodiments.

As an example, an e-commerce platform accumulates a large amount of data when a customer shops online, and each major e-commerce platform can accurately recommend a relevant store and product to the user according to this data. In contrast, it is relatively difficult for a customer to obtain shopping information efficiently in an in-store shopping scenario. As one example, this problem can be exacerbated when the customer first arrives at an unfamiliar region and has difficulties finding a preferred store and product, resulting in low shopping efficiency.

Based on the current location of a user—and partly in combination with historical paths of the user—the user can be guided while in an indoor environment (e.g., a brick-and-mortar store) to perform in-store shopping. Specifically, a real-time location of the user is obtained (e.g., via indoor Wi-Fi positioning, offline barcode, other GPS devices, etc.). Then, the user is guided with a moving path in the in-store environment, wherein a guide strategy is based on advertisement of a brand or a historical path of a user. The core of such purely offline-mode focuses on how to achieve accurate real-time indoor positioning. Real-time indoor positioning is a continuous process and forms an offline path diagram of the user, and the entire path diagram is an optimization of such concept. However, by this means, the accuracy of indoor positioning technology is not necessarily reliable. Further, since the user has the most direct sense of the store and the product in an in-store environment, senses such as vision, touch, hearing, and even taste of the user are fully occupied and activated. Therefore, a wireless device for obtaining a location has very weak influence on in-store real-time behavior and decision-making of the user and cannot effectively improve shopping efficiency for the user.

In addition, a user's intent may be analyzed and interpreted in real-time based on current online behavior of the user. Then, a system makes product recommendations to the user to guide the user to complete an online transaction. However, the online personalized display of a result of searching performed by the user does not take the in-store real-time location of the user into account. Thus, such a system cannot achieve online and offline integration and cannot guide the user to complete an in-store transaction. In addition, when an in-store discount is inconsistent with an online discount or when the product is out of stock, an online transaction cannot be guided, and therefore scenarios are not covered where the user makes a decision online and performs in-store shopping or the user makes a decision in-store and shops online.

Therefore, one feature of the example embodiments is the integration of a large amount of various data (e.g., profile data, product data, and order data) of the customer accumulated online and in-store and by using a combination of real-time geographic location information of the user and offline data such as data regarding a city, a shopping place, a branded shop, and a product. The example embodiments provide precise recommendations, to the user, of a branded shop or a product preferred by the user near the user's location and guide the user to perform in-store shopping. The example embodiments thus integrate online data and offline data, improve purchase efficiency for the user, effectively provide personalized shopping recommended content to the user, and greatly improve purchase experience of the user.

FIG. 1 is a flow diagram illustrating a method 100 for data processing according to some of the example embodiments.

In step 101, the method 100 can include obtaining or receiving location information and personalized information of a user.

In an embodiment, a user may be a client device. The user can browse shopping place objects (shopping places described below), branded shop objects (branded shops), and product objects (products) by means of the client device. The client device can store local data personalized for the user. Examples of local data include, but are not limited to, user profile data, shopping place data, branded shop data, etc. of n ∈ Z cities in which the user resides. A service may be a server. In an embodiment, the server stores complete data such as profile data of products, and the client device stores user data and still has a certain number of computations performed thereon, thereby reducing overheads of a data transmission network and time overhead and facilitating quick feedback of results to the user.

The profile data may describe a target object using data tags, so that certain personalized characteristics of the target object can be displayed. For example, the user profile data may use different data tags to describe personalized characteristics of the user, including gender, residence, age, interests, daily habits, etc Similarly, product profile data tags may include price, category, size, brand, etc. Therefore, data tags can facilitate a targeted service, accurate recommendation, etc.

In an embodiment, the client device may obtain location information and personalized information of the user in real-time. The location information may include latitude and longitude information of a current location of the user. In an embodiment, the personalized information may include a data tag used to describe a property of the user.

In some embodiments, the client device may provide personalized shopping guide information to the user. Therefore, the user may actively configure a push timing, a push frequency, etc. on the client device to activate the client device to present the shopping guide information. The user may also allow the client device to present the shopping guide information using a default push timing or using a default push frequency, and this is not limited by the disclosure.

In step 102, the method 100 can include determining a target region corresponding to the location information, the target region including at least one object matching the personalized information.

In an embodiment, the object may include a shopping place object, a branded shop object, a product object, etc. After the current location of the user is obtained, a corresponding target region can be determined, a shopping place object in the target region can be obtained by means of searching, and all branded shop objects in the shopping place object can be traversed to determine an object matching the personalized information of the user.

As one example, latitude and longitude information of the current location of the user can be obtained in real-time and geographic data of a city in which the user is located stored in the client device can be obtained via a query. Then, the latitude and longitude information can be used as the center of a circle to determine a target region based on a pre-configured radius (e.g., two kilometers). All shopping places in the target region and branded shops corresponding to the shopping places can then be obtained and a correspondence between the branded shop and the shopping place is determined. In one embodiment, if no shopping place or branded shop is found in a certain radius, then the pre-configured radius can be incremented (e.g., by one kilometer) until at least one shopping place or one branded shop is found in the target region to determine a target object corresponding to the personalized information of the user.

In some embodiments, after being authorized by a user, the client device may obtain the location information of the user in real-time using a positioning module included in the client device.

In step 103, the method 100 can include generating shopping guide data for the user based on the at least one object matching the personalized information.

In an embodiment, the client device may perform filtering and matching on the obtained branded shop objects by means of the personalized information to determine in-store shopping guide data to guide the user to perform in-store shopping.

In some embodiments, location information and personalized information of a user may be obtained in real-time. Then, a target region corresponding to the location information is determined, wherein the target region includes at least one object matching the personalized information. Finally, shopping guide data is generated for the user based on the at least one object matching the personalized information. By obtaining the real-time location of the user and combining the location with personalized information (e.g., purchase preference of historical purchase behavior), a shopping place and branded shops near the user can be provided and the user can be guided to perform in-store shopping. The example embodiments improve purchase efficiency for the user via a location-based matching operation, effectively providing personalized shopping recommended content to the user, and greatly improving purchase experience of the user.

Figure 2:
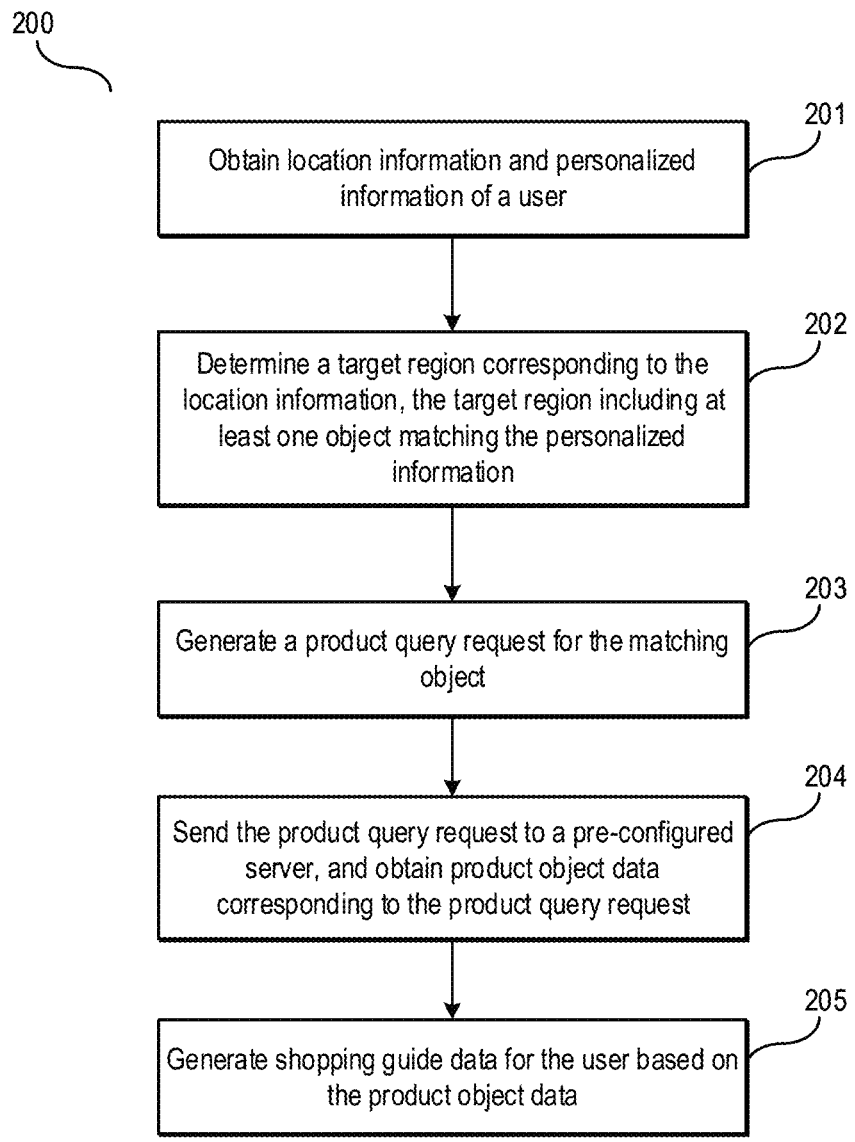
FIG. 2 is a flow diagram illustrating a method for data processing according to some of the example embodiments.

FIG. 2 is a flow diagram illustrating a method 200 for data processing according to some of the example embodiments.

In step 201, the method 200 can include obtaining location information and personalized information of a user.

In an embodiment, after being authorized by a user, a client device may acquire a current location of the user in real-time to obtain location information. In addition, the client device may store the personalized information of the user. In some embodiments, the personalized information can include profile data for describing the user by using a data tag, such as brand preference information, etc.

As one example, the client device may store data sets such as shopping place data, branded shop data, user preference profile data, city profile data, etc. of a city in which the user is located. The server may store complete shopping place data, complete branded shop data, complete user preference profile data, complete city profile data, etc. The client device can further store relevant data and has a certain amount of computations performed thereon, thereby reducing overhead of a data transmission network and time overhead, and facilitating quick feedback of results to the user.

In an embodiment, the server may process basic data such as user data, product data, order data, etc. to obtain profile data such as a shopping place, a user preference, a branded shop, a city, etc. Specifically, user data of online users and that of in-store users may be integrated. For the online users, user data may be integrated by associating accounts. For the in-store users, user data integration may be achieved by associating users by means of a unique identifier such as a license number, customer loyalty number, etc. Regarding product data, since the same type of products have the same product number (e.g., stock-keeping unit, universal product code, etc.) whether online or in-store, the same product can be located by means of a product number, color, size, etc. to integrate product data. Regarding order data, since corresponding order data is generated no matter whether the user places an order online or performs purchase in-store, the order data can be distinguished based on the above integrated user data and product data to determine a unique identifier corresponding to each piece of order data and mark the order data, including an online order and an in-store order, to integrate the order data.

After the integrated user data, product data, and order data are obtained, this data can be processed to obtain profile data such as a shopping place, a user preference, a branded shop, a city, etc. There may be a variety of profile data. In an embodiment, the profile data may be basic profile data (e.g., the gender of the user) and may be directly obtained from the basic data by extracting properties of the basic data. The profile data may also be obtained by means of statistics and performed based on rules. For example, based on purchase data of the user in the past ninety days, an average price range of a brand category preferred by the user can be calculated to obtain a price range of a certain brand category preferred by the user. The profile data may also be based on an algorithmic model. For example, based on purchase behavior of the user in the past one or two years, a branded shop under a high-frequency word-based purchase category that may be preferred by the user is predicted to recommend similar brands based on the branded shop where the user frequently performs purchase and a corresponding price. Alternatively, the model can locate, based on purchase habits between a target user and other similar users, a branded shop preferred by the target user. This is not limited by the disclosure.

Data sets such as the shopping place data, the branded shop data, the user preference profile data, the city profile data, etc. may be organized and regularized. A general data set can be established to provide a query service, and the server can regularly update the data set stored in the client device. In addition, the server may also optimize the algorithm model regularly to ensure the freshness of the data set. The client device may store only a data set corresponding to a user account logged in to the client device. For example, the client device stores shopping place data, branded shop data, etc. of two cities in which the user resides.

In step 202, the method 200 can include determining a target region corresponding to the location information, the target region including at least one object matching the personalized information.

In an embodiment, the object may include a shopping place object, a branded shop object, a product object, etc. Therefore, after the current location of the user is obtained, a corresponding target region can be determined, a shopping place object in the target region can be obtained by means of searching, and all branded shop objects in the shopping place object can be traversed to determine an object matching the personalized information of the user.

In step 203, the method 200 can include generating a product query request for the matching object.

In an embodiment, the object may include the branded shop object in the target region and the personalized information may include the brand preference information of the user. Therefore, the client device may perform matching between the brand preference information of the user and the branded shop object and obtain at least one target branded shop object. Then, place location information of a target shopping place object to which the target branded shop object belongs is obtained. Then, a product query request for the target branded shop object is generated by using the place location information.

In an embodiment, the client device may obtain the personalized information of the user based on the currently logged-in user account, extract the brand preference information of the user from the personalized information, then extract top N target preferred brands from all pieces of the brand preference information. The client device can then perform matching between the N target preferred brands and the branded shop object in the target region to obtain at least one target branded shop object. From this data, the client device can determine, based on a correspondence between the shopping place object and the branded shop object in the target region, a shopping place object to which the target branded shop object belongs and obtain place location information of the shopping place object. Finally, the client device can generate a product query request for the target branded shop object by using the place location information and a place identifier of the shopping place object to send the product query request to the server to obtain corresponding product object data.

In step 204, the method 200 can include sending the product query request to a pre-configured server and obtaining product object data corresponding to the product query request.

In an embodiment, the client device may send the product query request to the server, query the server to obtain complete product data, and obtain product object data corresponding to the target region. The client device can then provide, by obtaining the real-time location of the user in combination with a purchase preference of historical purchase behavior of the user, a shopping place and a branded shop located near the user and guide the user to perform in-store shopping, thereby improving purchase efficiency for the user, effectively providing personalized shopping recommended content to the user, and greatly improving purchase experience of the user.

In an example, after the user authorizes the client device to obtain the location of the user, the client device may obtain the current location of the user by means of positioning. Using the current location, the client device can query a server to obtain, based on longitude and latitude information obtained via the positioning, geographic data of a city in which the user is located stored in the client device. Then, the client device can obtain shopping places within, for example, two kilometers, and obtain branded shops in each shopping place. Next, the client device can query to obtain, based on the user account, user profile data stored in the client device, and extract the brand preference information of the user from the profile data. The brand preference information may include branded shops sorted in a pre-configured sorting manner; for example, the branded shops preferred by the user may be sorted by purchase frequency, brand price, browsing frequency, etc.

As one example, the client device can then extract the top thirty branded shops from the branded shops preferred by the user and perform matching between these thirty branded shops and all of the branded shops in the shopping places within two kilometers. As a result, the client device can obtain a target branded shop within two kilometers that is preferred by the user. Further, the client device can obtain location information and a location identifier of a shopping place to which the target branded shop belongs. The client device can generate a product query request by using the location information and the location identifier of the shopping place and a brand identifier of the target branded shop and then send the product query request to the server.

The server may parse the product query request to obtain the brand identifier of the target branded shop and the location information of the shopping place. Then, the server can obtain matching product object data from the complete product object data based on the brand identifier of the target branded shop and the location information of the shopping place to obtain product object data of branded shops available in the shopping places within two kilometers from the user and preferred by the user. As an example, the product object data may include the top ten new products, top ten best-selling products, top ten discount products, etc. of a certain target branded shop.

In step 205, the method 200 can include generating shopping guide data for the user based on the product object data.

In an embodiment, after obtaining the product object data, the client device may parse the product object data to obtain a product object corresponding to the product query request and attribute information of the product object. The attribute information may include introduction information, image information, and price information of the product object, a shopping place to which the product object belongs, etc. Then, the client device may generate a product list by using the attribute information of the product object and display the product list. The product list may include a product display location corresponding to the product object, and different product display locations correspond to relevant information of displayed product objects. Therefore, the user can intuitively learn, from the product list, the products corresponding to a preferred branded shop near the current location, so that by obtaining the real-time location of the user in combination with a purchase preference of historical purchase behavior of the user, a shopping place and a branded shop located near the user can be provided and the user can be guided to perform in-store shopping, thereby improving purchase efficiency for the user, effectively providing personalized shopping recommended content to the user, and greatly improving purchase experience of the user.

In addition, the client device may also extract, from the attribute information of the product object, price information of the product object in different shopping place objects, and display price comparison information of the product object in the different shopping place objects.

In an embodiment, the product object data may be processed, and displaying of the same may include three scenarios. Regarding a product object available both online and in-store, price comparison of the product object in different shopping places each having this product both online and in-store may be displayed to guide the user to shop in an appropriate manner, thereby improving shopping efficiency while enabling the user to purchase a preferred and affordable product. Regarding a product available only either online or in-store, the product display location is used to display the product. For example, attribute information of the product object may be displayed by means of a product card in the product list. However, this is not limited by the disclosure.

In an embodiment, if the user is interested in a certain product object in the product list, then the client device may respond to a user operation performed on the product display location. The client device can determine a target product object selected by the user and display product detail information of the target product object. The product detail information at least includes one of product introduction information of the target product object, a target branded shop object to which the same belongs, a target shopping place object to which the same belongs, and shop location information of the target branded shop object.

In addition, if the client device detects that the location information successfully matches the shop location information, then it indicates that the user has arrived at a corresponding branded shop, and sales promotion information configured by this branded shop may be obtained, so that the user can perform in-store shopping based on the sales promotion information.

In an embodiment, if the user is interested in a product recommended by the client device, then a corresponding product display location may be selected, and the client device displays corresponding product detail information and continues to acquire the location information of the user at the same time. If it is detected that the user has arrived at a branded shop of a corresponding shopping place, and if the branded shop is having marketing activities, then corresponding sales promotion information may be obtained, for example, scanning a code for double points, issuing coupons, etc., so that during purchase of the corresponding product, the user can show a corresponding two-dimensional code, barcode, coupon code, etc. to obtain shopping discounts.

The client device may further provide a feedback control in the product display location. If the user is not interested in shopping guide content provided by the client device, then the user may send feedback by means of the feedback control. Specifically, in response to a selection operation performed on the feedback control, the client device may select a corresponding target product display location, generate feedback information for the target product display location. Then, the client device can send the feedback information to the server, so that feedback can be provided by means of a return of in-store shopping performed by the user and active feedback of the user, thereby facilitating service improvement by acquiring user requirements, and improving shopping experience of the user.

If the user has arrived at the branded shop of the corresponding shopping place, but the product is out of stock in-store or is not in the desired size in the branded shop or an in-store price is not lower than an online price, then the user may choose to place an order online to purchase the corresponding product online Specifically, in response to the user operation performed on the product display location, the client device may determine a target product object and display an order interface for the target product object. Then, generate order information for the target product object in response to a user operation performed on the order interface. For example, if the user selects a desired product in the product list and places an order, then the client device may display a corresponding order interface, and the user may fill in relevant information in the order interface or directly use default information including an address, contact information, a remark, etc., so that the client device may generate corresponding order information to complete the online shopping of the user, thereby improving purchase efficiency for the user, effectively providing personalized shopping recommended content to the user, and greatly improving purchase experience of the user.

In the embodiments of the disclosure, location information and personalized information of the user are obtained in real-time, then a target region corresponding to the location information is determined, the target region including at least one shopping place object, the shopping place object including at least one branded shop object. Then, in-store shopping guide data for the branded shop object is generated based on the personalized information of the user. The real-time location of the user is obtained in combination with a purchase preference of historical purchase behavior of the user, to provide a shopping place and a branded shop near the user and guide the user to perform in-store shopping, thereby improving purchase efficiency for the user, effectively providing personalized shopping recommended content to the user, and greatly improving purchase experience of the user.

To enable those skilled in the art to better understand the technical solution of the embodiments of the disclosure, the following uses an example to illustrate and explain the embodiments of the disclosure.

Figure 3:
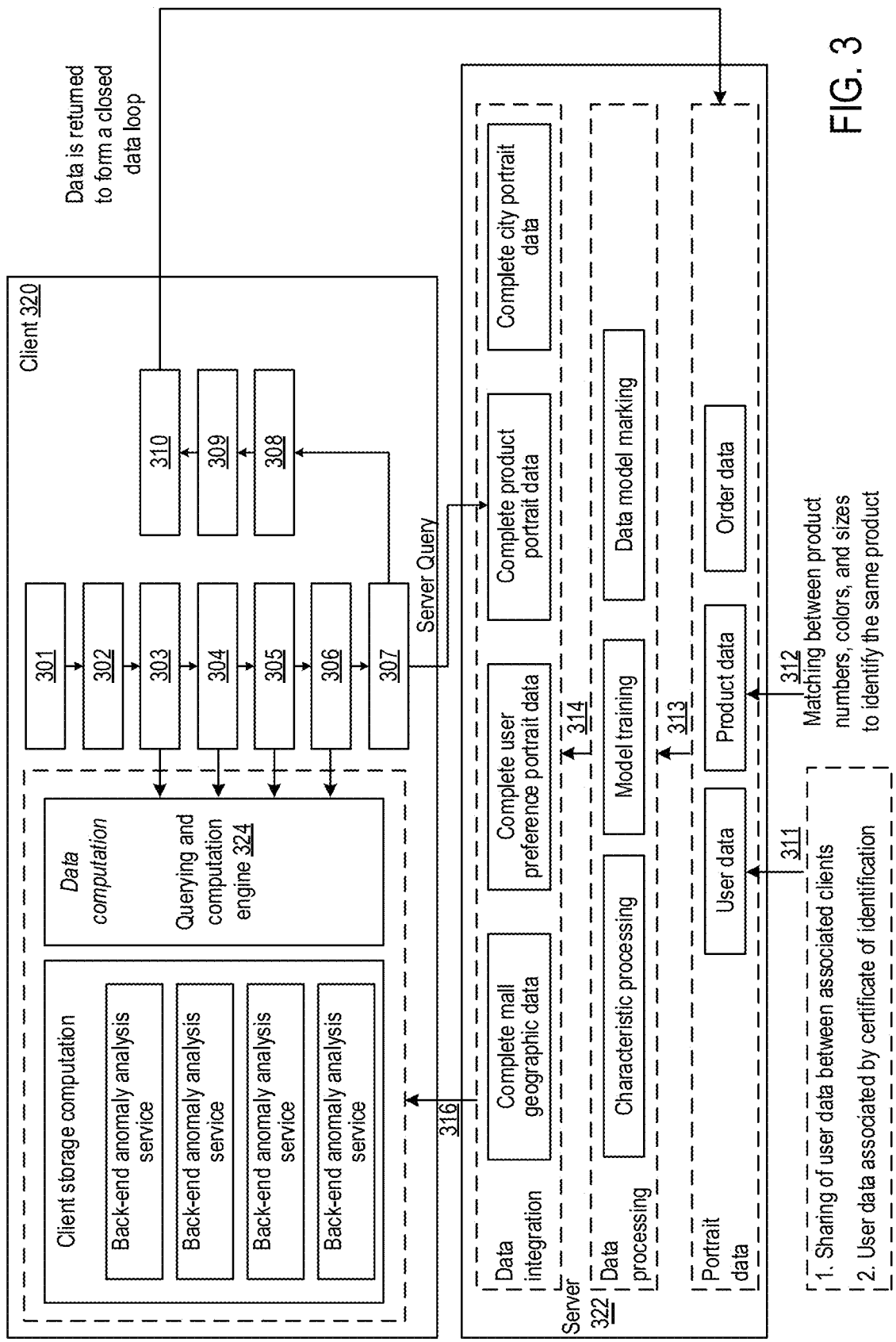
FIG. 3 is a flow diagram illustrating a system and method for recommending products according to some of the example embodiments.

FIG. 3 is a flow diagram illustrating a system and method for recommending products according to some of the example embodiments.

A real-time location of the user is obtained in combination with geographic data of a mall brand, and preference profile data of online and in-store purchase behavior of the user, to guide the user to shop in a preferred branded store within 2 km, select top-ranked new products, top-ranked best-selling products, and top-ranked discount products of the brand for the user, and provide price comparison of the same product available online and in-store, thereby improving in-store shopping efficiency for the user, enabling the user to purchase a preferred product at a greatest discount. In addition, a device architecture adopts an integrated end-to-cloud solution mainly employing end computing, thereby supporting the real-time and high-concurrency scenario of this solution more quickly, and reducing most of network bandwidth consumption and delay in data transmission. The process specifically comprises the following steps.

In step 301, a user actively performs clicking on a client 320 to activate a function of product recommendation, or may configure a push timing, a push frequency, etc., so that the client 320 can actively activate a recommendation to the user of a product of a nearby brand preferred thereby. The client 320 may be an application running in a user terminal, such as a shopping application and so on.

In step 302, during use of the client 320 by the user, the user may be queried whether obtaining of a location of the user is permitted and location information may be obtained by means of positioning after the permission is obtained.

In step 303, based on current latitude and longitude data of the user obtained by means of positioning, geographic data of a city in which the user is located stored in the client is obtained by means of query, and malls within two kilometers are obtained.

In step 304, based on the malls within two kilometers from the user obtained in step 303, branded shops of these malls stored in the client are obtained by means of query, and a correspondence between the mall and the branded shop is obtained.

In step 305, based on a user account logged in to the client 320, user profile data stored in the client 320 is obtained by query, and top thirty brands preferred by the user are extracted from the profile data.

In step 306, matching and computation are performed on results of steps 304 and 305, and the client 320 also performs querying and computation to obtain a target branded shop of a brand preferred by the user within two kilometers, a mall to which the target branded shop belongs, and a location and an identifier of the mall.

In step 307, based on a result of step 306, complete product data corresponding to the target branded shop is obtained by querying a server 322 to obtain product object data of the brand preferred by the user and available in the malls within two kilometers, the product object data including product object data of top ten new products, top ten best-selling products, and top ten discount products of the brand, and the product object data is returned to the client 320.

In step 308, content of the data obtained in step 307 is organized, and the content organization specifically includes three scenarios. Regarding a product available both online and in-store, price comparison of the product in different malls each having this product both online and in-store is displayed. If basic product information is displayed only online or in-store, then a final result provided to the user is a card of a product list.

In step 309, the user may view a recommendation result of the client 320. If the user is interested, then the user may go to a recommended mall, and if not, then the user may click "Not Interested" to facilitate data returning and effect evaluation.

In step 310, if the client 320 detects that the user has arrived at the branded shop of the corresponding mall, and if the branded shop is having marketing activities such as scanning a code for double points or issuing coupons, then the user may participate in activities when purchasing the corresponding product to facilitate data loop closing and effect evaluation of this solution. If the product is out of stock in-store or is off size or if an in-store price is not lower than an online price, then in the product list provided by the client 320, the recommended product list card may also be directly clicked to place an order.

In some embodiments, computations in steps 301 through 306 mentioned above are all performed locally in the client 320. The client 320 may store user city mall geographic data, user city product brand data, user preference profile data, user city profile data, etc. The client 320 performs related data computation by means of a querying and computation engine 324 to obtain a corresponding query result.

In addition, the processes of data processing of the client 320, data processing of the server 322, and data processing between the client 320 and the server 322 may comprise the following steps.

In step 311, online users and in-store users are integrated. If service cooperation is present or the two are in the same system, for example, if a user account is used in a plurality of different clients, then one method for integration is to connect user data during design of a service side to integrate the user data. Another method is to perform real-name authentication for the user during registration, so that the same person can be identified by associating and matching of a certificate of identification.

In step 312, with regard to brand data, since the same type of products have the same product number whether online or in-store, the same product can be uniquely located by means of a product number, color, and size to integrate product data.

In step 313, order data of the user will be generated when the user places an order and pays online, and the same will also be generated when the user performs in-store shopping. Therefore, after online and in-store integration of the user data and the product data obtained in steps 311 and 312 mentioned above, the order data is distinguished based on the integrated user data and product data, a unique identifier of the order data is determined. Then, the order is marked as an online order or an in-store order to integrate the order data.

In step 314, after the integrated basic data such as user data, product data, and order data are obtained, profile data such as a user preference, product, city, etc. may be obtained by means of computation. There may be a variety of tags of profile data. One of the tags is basic information such as the gender of the user and is obtained directly from the basic data. Another tag may be obtained by means of statistics and determination performed based on a rule; for example, based on purchase data of the user in the past ninety days, an average price range of a brand category preferred by the user is calculated to obtain a price range of a certain category preferred by the user. Another tag may also be based on an algorithmic model; for example, based on purchase behavior of the user in the past one or two years, a branded shop under a frequently purchased category that may be preferred by the user is predicted; similar branded shops may be recommended based on positioning and a price of a brand frequently purchased by the user, or a branded shop that may be preferred by the user may also be located based on purchase habits of users relatively similar to the user.

In some embodiments, the server may organize and regularize data sets such as mall geographic data, user preference profile data, product profile data, city profile data, etc., and establish a general data set to provide a query service.

In step 316, the server 322 regularly updates the data set stored in the client 320. The data stored in the client 320 is personalized data for the user account logged in to the client. The client 320 may store only a data set relevant to the user. For example, a mall region stores profile data of two cities in which the user resides, and brand data stores mall brand data of the two cities in which the user resides.

In some embodiments, with regard to the method embodiments, all of them are expressed as a combination of a series of actions for simplicity of description; but those skilled in the art will recognize that the embodiments of the disclosure are not limited by the described order of actions as some steps may, in accordance with the embodiments of the disclosure, be carried out in other orders or simultaneously. Secondly, those skilled in the art should also appreciate that the embodiments described in the specification all belong to the preferred embodiments and that the involved actions are not necessarily required by the embodiments of the disclosure.

Figure 4:
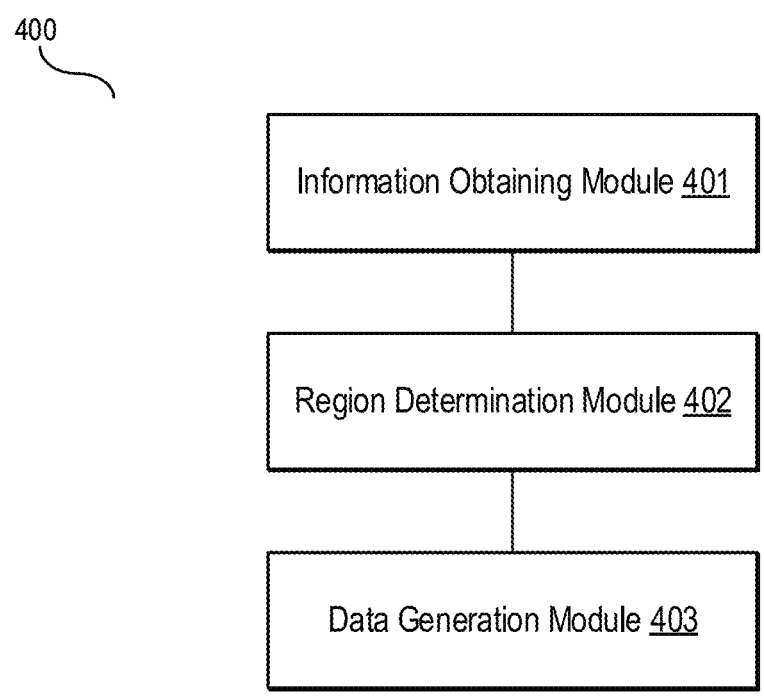
FIG. 4 is a block diagram of a system for data processing according to some of the example embodiments.

FIG. 4 is a block diagram of a system for data processing according to some of the example embodiments.

The apparatus 400 may specifically include an information obtaining module 401, a region determination module 402, and a data generation module 403. In an embodiment, the obtaining module 401 can be configured to obtain location information and personalized information of a user. In an embodiment, the region determination module 402 can be configured to determine a target region corresponding to the location information, the target region comprising at least one object matching the personalized information. In an embodiment, the data generation module 403 can be configured to generate shopping guide data for the user based on the at least one object matching the personalized information.

In an embodiment, the data generation module 403 includes a product query request generation sub-module that can be configured to generate a product query request for the matching object. The data generation module 403 can further include a product object data obtaining sub-module that can be configured to send the product query request to a pre-configured server and obtain product object data corresponding to the product query request. The data generation module 403 can further include a shopping guide data generation sub-module that can be configured to generate the shopping guide data for the user based on the product object data.

In an embodiment, the product object data at least includes a product object corresponding to the product query request and attribute information of the product object. In such an embodiment, the shopping guide data generation sub-module can include a product list generation unit, configured to generate a product list by using the attribute information of the product object, the product list comprising a product display location corresponding to the product object.

In an embodiment, the shopping guide data generation sub-module can include a price comparison display unit, configured to extract, from the attribute information of the product object, price information of the product object in different shopping place objects and display price comparison information of the product object in the different shopping place objects.

In an embodiment, the apparatus 400 can further include a detail information display module, configured to determine, in response to a user operation performed on the product display location, a target product object and display product detail information of the target product object, wherein the product detail information at least comprises one of product introduction information of the target product object, a target branded shop object to which the product belongs, a target shopping place object to which the product belongs, and shop location information of the target branded shop object.

In an embodiment, the apparatus 400 can further include a sales promotion information obtaining module, configured to obtain sales promotion information configured by the target branded shop object if it is detected that the location information successfully matches the shop location information.

In an embodiment, the apparatus 400 can further include an order interface display module, configured to determine, in response to a user operation performed on the product display location, a target product object and display an order interface for the target product object; and an order information generation module, configured to generate order information for the target product object in response to a user operation performed on the order interface.

In an embodiment, the product display location includes a feedback control, and the apparatus 400 can further include a feedback information processing module, configured to select, in response to a user operation performed on the feedback control, a target product display location, generate feedback information for the target product display location, and send the feedback information to the pre-configured server.

In an embodiment, the object includes a branded shop object; the personalized information at least includes brand preference information. In such an embodiment, the product query request generation sub-module can further include a shop object selection unit, configured to perform matching between the brand preference information of the user and the branded shop objects and obtaining at least one target branded shop object; and a location information obtaining unit, configured to obtain place location information of a target shopping place object to which the target branded shop object belongs; and a query request generation unit, configured to generate a product query request for the target branded shop object by using the place location information.

In an embodiment, the product query request generation sub-module can further include a preferred brand extraction unit, configured to extract N target preferred brands from the brand preference information of the user.

In an embodiment, the shop object selection unit can be configured for performing matching between the N target preferred brands and the branded shop objects and obtaining at least one target branded shop object.

With regard to the apparatus embodiments, because the apparatus embodiments are substantially similar to the method embodiments, the description is relatively concise, and reference can be made to the description of the method embodiments for related parts.

Further provided in the embodiments of the disclosure is an electronic device, including: a processor and a storage medium for tangibly storing thereon program logic for execution by the processor, the stored program logic causing the electronic device to perform the methods according to the embodiments of the disclosure.

Further provided in the embodiments of the disclosure is a non-transitory computer readable storage medium for tangibly storing computer program instructions capable of being executed by a computer processor, the computer program instructions defining the steps of the methods described previously.

Various embodiments in the specification are described in a progressive way, each embodiment focuses on the differences one has from others; and for the same or similar parts between various embodiments, reference may be made to the description of other embodiments.

Those skilled in the art should note that embodiments of the disclosure may be provided as a method, an apparatus, or a computer program product. Therefore, an embodiment of the disclosure may use forms of a full hardware embodiment, a full software embodiment, or an embodiment combining software and hardware aspects. Moreover, an embodiment of the disclosure may be in the form of a computer program product implemented on one or more machine-readable media (including, but not limited to, a magnetic disk storage, a CD-ROM, an optical memory, etc.) containing computer usable program code therein.

The embodiments of the disclosure are described with reference to flow charts and/or block diagrams according to the method, terminal device (system) and computer program product according to the embodiments of the disclosure. It should be understood that each procedure and/or block in the flowcharts and/or block diagrams, and a combination of procedures and/or blocks in the flowcharts and/or block diagrams may be implemented with computer program instructions. These computer program instructions may be provided to a general-purpose computer, a special-purpose computer, an embedded processor, or a processor of any other programmable data processing terminal device to generate a machine, so that the instructions executed by a computer or a processor of any other programmable data processing terminal device generate an apparatus for implementing a specified function in one or more processes in the flowcharts and/or in one or more blocks in the block diagrams.

These computer program instructions may also be stored in a computer-readable memory that can direct a computer or another programmable data processing terminal device to operate in a particular manner, such that the instructions stored in the computer-readable memory produce an article of manufacture including instruction means, the instruction means implementing the functions specified in one or more flows of the flowcharts and/or one or more blocks of the block diagrams.

These computer program instructions may also be loaded onto a computer or another programmable data processing terminal device such that a series of operational steps are performed on the computer or another programmable terminal device to produce a computer-implemented processing, and thus the instructions executed on the computer or another programmable terminal device provide the steps for implementing the functions specified in one or more flows of the flowcharts and/or one or more blocks of the block diagrams.

Preferred embodiments of the embodiments of the disclosure have been described; however, once knowing basic creative concepts, those skilled in the art can make other variations and modifications on these embodiments. Therefore, the appended claims are intended to be interpreted as including the preferred embodiments and all variations and modifications falling within the scope of the embodiments of the disclosure.

Finally, it should be further noted that in this text, the relation terms such as first and second are merely used to distinguish one entity or operation from another entity or operation, and do not require or imply that the entities or operations have this actual relation or order. Moreover, the terms "include," "comprise" or other variations thereof are intended to cover non-exclusive inclusion, so that a process, a method, an article or a terminal device including a series of elements not only includes the elements, but also includes other elements not clearly listed, or further includes inherent elements of the process, method, article or terminal device. In a case without any more limitations, an element defined by "including a/an . . . " does not exclude that the process, method, article or terminal device including the element further has other identical elements.

A method for data processing and an apparatus for data processing provided in the disclosure are described in detail above. The principles and implementations of the disclosure are set forth herein with reference to specific examples. Descriptions of the above embodiments are merely served to assist in understanding the method and the essential concepts of the disclosure. Those of ordinary skill in the art may make changes to specific implementations and the scope of application according to the concepts of the disclosure. In view of the above, the content of the description should not be construed as limiting the disclosure.

We claim:

1. A method comprising:
    receiving, by a processor, physical location information and preference data of a user, the physical location information comprising a geographic location of a client device associated with the user;
    determining, by the processor, a target spatial region based on the physical location information, the target spatial region associated with at least one physical object currently located in the target spatial region related to the preference data of the user, wherein determining a target spatial region further comprises: identifying a first target spatial region using the physical location information; searching the first target spatial region for the at least one physical object currently located in the spatial region related to the preference data; increasing a size of the first target spatial region to obtain a second target spatial region upon determining that no objects are identified; and searching the second target spatial region for the at least one physical object currently located in the spatial region related to the preference data;
    generating, by the processor, guide data based on the at least one physical object related to the preference data; and
    transmitting, by the processor, the guide data to the client device in response to receiving the physical location information and user related information.

2. The method of claim 1, wherein receiving user related information comprises receiving at least one tag, the at least one tag comprising a tag generated locally by the client device.

3. The method of claim 1, wherein searching the first target spatial region for the at least one physical object currently located in the spatial region related to the preference data comprises searching an integrated data set using the first target spatial region, the integrated data set including data collected from online data sources and offline data sources, a given item of online data and offline data integrated using a shared field.

4. The method of claim 1, wherein generating guide data comprises generating a moving path for the client device to follow based on the physical location information and a location associated with the at least one physical object.

5. The method of claim 1, wherein generating the guide data comprises generating an object list by using attribute information of the at least one physical object, the object list comprising display locations corresponding to the at least one physical object.

6. A non-transitory computer-readable storage medium for tangibly storing computer program instructions capable of being executed by a computer processor, the computer program instructions defining steps of:

receiving physical location information and preference data of a user, the physical location information comprising a geographic location of a client device associated with the user;

determining a target spatial region based on the physical location information, the target spatial region associated with at least one physical object currently located in a spatial region related to the preference data, wherein determining a target spatial region further comprises: identifying a first target spatial region using the physical location information; searching the first target spatial region for the at least one physical object currently located in the spatial region related to the preference data; increasing a size of the first target spatial region to obtain a second target spatial region upon determining that no objects are identified; and searching the second target spatial region for the at least one physical object currently located in the spatial region related to the preference data;

generating guide data based on the at least one physical object related to the preference data; and transmitting the guide data to the client device in response to receiving the physical location information and user related information information.

7. The non-transitory computer-readable storage medium of claim 6, wherein receiving user related information information comprises receiving at least one tag, the at least one tag comprising a tag generated locally by the client device.

8. The non-transitory computer-readable storage medium of claim 6, wherein searching the first target spatial region for the at least one physical object currently located in the spatial region related to the preference data comprises searching an integrated data set using the first target spatial region, the integrated data set including data collected from online data sources and offline data sources, a given item of online data and offline data integrated using a shared field.

9. The non-transitory computer-readable storage medium of claim 6, wherein generating guide data comprises generating a moving path for the client device to follow based on the physical location information and a location associated with the at least one physical object.

10. The non-transitory computer-readable storage medium of claim 6, wherein generating the guide data comprises generating an object list by using attribute information of the at least one physical object, the object list comprising display locations corresponding to the at least one physical object.

11. A device comprising:
a processor; and
a storage medium for tangibly storing thereon program logic for execution by the processor, the program logic comprising:
logic, executed by the processor, for receiving physical location information and preference data of a user, the physical location information comprising a geographic location of a client device associated with the user;
logic, executed by the processor, for determining a target spatial region based on the physical location information, the target spatial region associated with at least one physical object currently located in a spatial region related to the preference data, wherein determining a target spatial region further comprises: identifying a first target spatial region using the physical location information; searching the first target spatial region for the at least one physical object currently located in the spatial region related to the preference data; increasing a size of the first target spatial region to obtain a second target spatial region upon determining that no objects are identified; and searching the second target spatial region for the at least one physical object currently located in the spatial region related to the preference data;
logic, executed by the processor, for generating guide data based on the at least one physical object related to the preference data; and
logic, executed by the processor, for transmitting the guide data to the client device in response to receiving the physical location information and user related information information.

12. The device of claim 11, wherein receiving user related information information comprises receiving at least one tag, the at least one tag comprising a tag generated locally by the client device.

13. The device of claim 11, wherein searching the first target spatial region for the at least one physical object currently located in the spatial region related to the preference data comprises searching an integrated data set using the first target spatial region, the integrated data set including data collected from online data sources and offline data sources, a given item of online data and offline data integrated using a shared field.

14. The device of claim 11, wherein generating guide data comprises generating a moving path for the client device to follow based on the physical location information and a location associated with the at least one physical object.

* * * * *